United States Patent

[11] 3,602,560

[72] Inventor Manfred Memmel
 Schweinfurt, Germany
[21] Appl. No. 879,662
[22] Filed Nov. 25, 1969
[45] Patented Aug. 31, 1971
[73] Assignee SKF Kugellagerfabriken GmbH
 Schweinfurt, Germany
[32] Priority Nov. 27, 1968
[33] Germany
[31] G 68 08 807

[54] BALL AND SOCKET JOINT
 11 Claims, 7 Drawing Figs.
[52] U.S. Cl. .................................................... 308/238,
 308/72, 287/88
[51] Int. Cl. .................................................... F16c 27/00,
 F16c 33/28
[50] Field of Search ......................................... 308/238,
 72, 239; 287/87, 88, 90 R, 90 C

[56] References Cited
 UNITED STATES PATENTS
| | | | |
|---|---|---|---|
| 2,439,971 | 4/1948 | Freeman | 308/239 |
| 3,072,449 | 1/1963 | Morley et al. | 308/238 |
| 3,193,910 | 7/1965 | Evans | 287/87 X |

Primary Examiner—Martin P. Schwadron
Assistant Examiner—B. L. Grossman
Attorneys—Richard Low and Murray Schaffer ABSTRACT: The bearing face of the socket member of a ball and socket joint arrangement carries circular polytetrafluoroethylene discs retained in a cage and radially projecting from the cage for sliding engagement with the bearing face of the ball member of the joint. Lateral spread of the discs is limited by an annular groove in the face of the cage spacedly opposite the ball face about each disc, and also by metal inserts and backing elements of various shapes.

INVENTOR.
MANFRED MEMMEL

BALL AND SOCKET JOINT

This invention relates to bearing arrangements, and particularly to ball and socket joints.

It is known to mount plastic gliding elements in a cage between spacedly opposite faces of two metallic bearing members. One of the faces is provided with recesses which partly receive the gliding elements. The other bearing member engages only exposed surfaces of the gliding elements which project from the respective recesses.

The known bearing arrangement has low-friction losses, but its capacity is limited. If the bearing load is greater than the compressive strength of the plastic elements, the projecting portion of each gliding element bulges laterally into the gap between the two bearing members. The bulge portion is subjected to higher specific stresses than the main portion of the gliding element because of its smaller thickness in the direction of applied stress, and is subject to rapid wear between the much harder, metallic bearing members.

It is an object of this invention to provide a bearing arrangement enjoying the advantages of the aforedescribed known arrangement, but capable of withstanding much higher stresses under otherwise analogous conditions.

With these and other objects in view, as will hereinafter become apparent, the invention provides a bearing arrangement in which two bearing members have spacedly opposite respective convexly and concavely arcuate faces. Antifriction or gliding elements are superposed on the face of one of the bearing members in sliding engagement with the face of the other bearing member. The material of the antifriction or gliding elements is selected so as to have a substantially lower coefficient of friction with the slidingly engaged face than the face of the supporting bearing member.

A retaining device interposed between the elements retains them in substantially fixed, respective positions on the face of the supporting bearing member, a portion of each element projecting beyond the retaining device toward the slidingly engaged bearing member. Means are provided for limiting the lateral displacement of the projecting portion of each element.

Other features, additional objects, and many of the attendant advantages of this invention will readily become apparent from the following detailed description of a preferred embodiment and of variations thereof, when considered in connection with the appended drawing in which.

Figure 1:
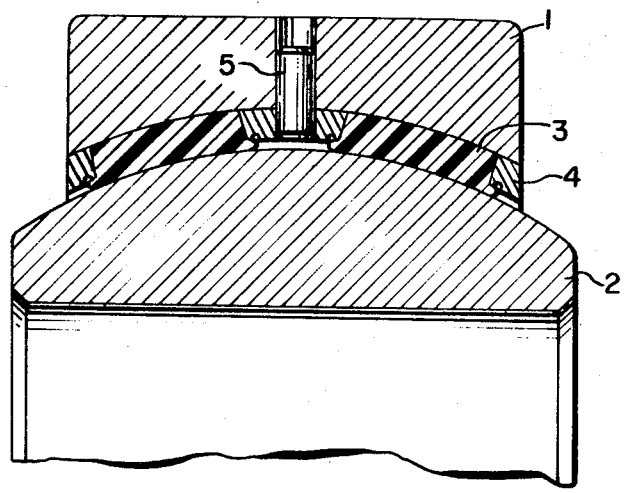
FIG. 1 shows a ball and socket joint of the invention in section through its center of rotation.

FIGS. 3–7 respectively show variations of a gliding or antifriction element for the device of FIG. 1.

Referring now to the drawing in detail, and initially to FIG. 1, there is seen only as much of a ball and socket joint as is necessary for an understanding of the invention. The illustrated device has a socket member 1 and a ball member 2 whose spherically arcuate faces are spacedly opposite and have a common center curvature. Circular discs 3 are set in a cage 4 on the concavely dished face of the socket member 1 and are fastened to the socket member by a pin 5 fixedly attached to the socket member 1 and to the cage 4.

Figure 2:
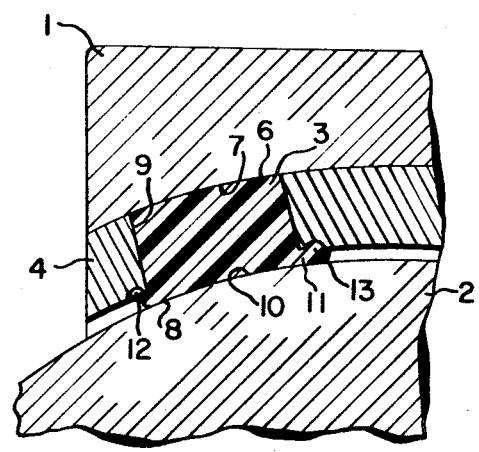
FIG. 2 illustrates a portion of the device of FIG. 1 on a larger scale.

As is better seen in FIG. 2, the gliding elements 3 have outer faces 6 abuttingly engaging the concave face 7 of the socket member 1. The exposed faces 8 of the elements 3 project from recesses 9 in the cage 4 in which the elements are partly received so that the spherically convex face 10 of the ball member 2 makes contact only with the exposed faces 8 of the elements 3. The discs or gliding elements 3 are preferably somewhat larger than their respective recess 9 and are inserted within their recess under conditions of compressive stress so that they expand when relaxed to completely fill the recess and to be retained therein at least partly by their own resiliency as well as the shape of the recess.

The elements 3 of the illustrated embodiment consist of polytetrafluoroethylene, while all other illustrated joint members consist of metal, particularly steel, and are much more rigid and mechanically stronger than the elements 3. It is preferable that the cage 4 be formed of material which has good sliding properties that is a low coefficient of friction with respect to the other elements.

When the bearing pressure between the members 1, 2 becomes sufficiently high, the initially approximately cylindrical elements 3 are deformed under the compressive stress, and an annular bead 11 is extruded laterally into the gap between the opposite faces of the ball member 2 and of the cage 4.

The face of the cage 4 which surrounds each element 3 is formed with an annular groove 12 about the element and closely adjacent the same. The lateral expansion of the element 3 is limited by the groove. An annular portion 13 of the bead 11 enters the groove 12 and firmly anchors the bead 11, preventing further lateral spread unless the contact pressure is very much further increased.

As pointed out above, the lateral creep of the plastic element into the gap between radially opposite faces of the associated bearing members causes rapid wear of the plastic because of stress concentration in the thin extruded layer which is deformed by an equal absolute amount as the much thicker main portion of the material recessed in the cage 4 or a similar recess of a bearing member.

To reduce or avoid stress concentration in the bead 11, the main body of each element 3 is preferably provided with a stiffening insert as exemplified by the variations of gliding or antifriction elements illustrated in FIGS. 3–7, the insertstending to distribute compressive stresses more uniformly throughout the element.

Figure 3:
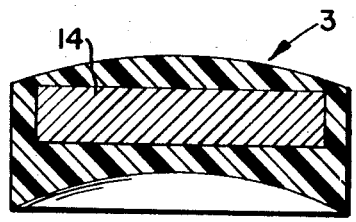
Figure 4:
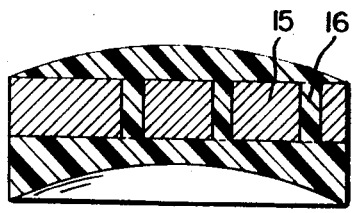

The element shown in FIG. 3 is provided with a molded-in circular sheet metal disc 14 coaxial with the plastic body and completely embedded in the same. If it is desired to make a plate-shaped insert so large as to reach the cylindrical surface of the element, as shown in FIG. 4, the disc-shaped insert 15 is provided with bores 16 extending therethrough in the direction of its thickness. The plastic material fills the bores during the molding process, and the portions of the elements on opposite sides of the insert are integrally connected through the bores.

Figure 5:
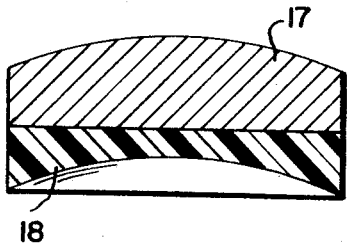

In extreme cases, a portion of the plastic thickness may be replaced by metal as is shown in FIG. 5 illustrating an element whose relatively thin front portion 18 consists of plastic whereas the backing portion 17 consists of metal, molded to the plastic.

Figure 6:
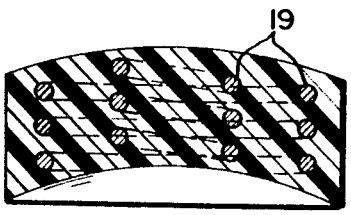

The stiffening insert illustrated in FIG. 6 consists of two coaxial helical metal springs 19 of different diameters molded into the plastic.

Figure 7:
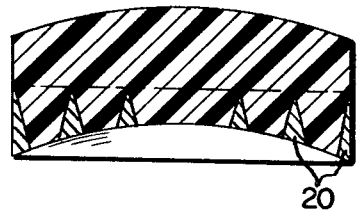

In the stiffened gliding or antifriction element shown in FIG. 7, three coaxial rings 20 of different diameters are set into the face of the antifriction element which normally engages the convex face of the ball member 2. The rings are each of triangular cross section and are arranged in the plastic material in such a manner that the face of the ring defined by one side of the triangle in cross section makes area contact with the aforementioned convex face of the ball member. The opposite apex of the triangle defines a sharp circular edge of the ring. As the softer plastic wears away during use of the joint, the sharp edge of each ring is driven deeper into the antifriction element. The outermost ring also makes contact with the sidewall of the recess 9, and prevents lateral spreading of the plastic material even in the absence of the groove 12.

Obviously, polytetrafluoroethylene is not the only synthetic resin composition which may be used successfully in a joint of the type described above. Depending on operating conditions, polyolefins such as polyethylene and polypropylene may be employed, and certain cellulose ethers have been used heretofore as antifriction elements, as well as thermosetting resins. Rubber compositions also may be used, as will be obvious to those skilled in the art. It is essential, however, that the material of the gliding or antifriction elements 3 reduce the bearing friction as compared to the friction resulting from direct contact of the bearing elements 1, 2.

It is preferred to arrange the plastic elements on the socket member of a ball and socket joint, but the opposite arrangement may be useful under special conditions. The applicability of the invention to bearings other than ball and socket joints is evident. Antifriction elements of noncircular cross section will normally be preferred in such bearings in which the spacedly opposite faces of the two bearing members may be cylindrically arcuate or even flat.

The problem of extrusion of the antifriction material into the gap between the bearing members inherently exists when the antifriction elements 3 are made of material much more resilient than the material of the cage 4, as will normally be the case. It may be desirable to coat the face of the cage 4 opposite the ball member 2 with a thin layer of polytetrafluoroethylene to prevent seizing of the joint when the elements 3 are worn down to the level of the cage, but such a thin plastic layer will not materially modify the aforediscussed stress distribution pattern, and will not make stiffening inserts unnecessary in joints intended for operation under relatively severe loads.

What is claimed is:
1. A bearing comprising, in combination:
   a. a first bearing member having a face;
   b. a second bearing member having a face spacedly opposite the bearing face of said first bearing member;
   c. a plurality of antifriction elements superposed on the face of one of said bearing members in gliding engagement with the face of the other bearing member,
      1. said antifriction elements being of a material having a substantially lower coefficient of friction in contact with said face of the other bearing member than said face of said one bearing member;
   d. a cage interposed between said bearing members for retaining said elements in substantially fixed respective positions on said face of the one bearing member, respective portions of said elements projecting beyond said cage toward said face of the other bearing member under application of a load on said bearing; and
   e. limiting means for limiting lateral displacement of the projecting portion of each element between said bearing members.

2. An arrangement as set forth in claim 1, wherein said cage has a face spacedly opposite said face of the other bearing member closely adjacent one of said elements and formed with a groove therein, the walls of said groove constituting said limiting means.

3. An arrangement as set forth in claim 2, wherein said elements are substantially circular in cross section, and said face and said groove are annular.

4. An arrangement as set forth in claim 2, wherein said gliding elements are of a material much more resilient than the material of said retaining member, each gliding element being provided with a stiffening member to prevent compression of said element beyond a predetermined load.

5. An arrangement as set forth in claim 4, wherein said gliding element consists essentially of a synthetic resin composition, said bearing members essentially consist of metal, and said stiffening member is metallic.

6. An arrangement as set forth in claim 4, wherein said stiffening member is a metal ring of triangular cross section embedded within said body, one of the sides of the triangle defining a face of said ring in area contact with said face of said other bearing member.

7. An arrangement as set forth in claim 4, wherein said stiffening member is a metal plate embedded in said gliding element.

8. An arrangement as set forth in claim 1, wherein said limiting means include a ring member inserted in at least one of said elements and having respective faces in contact with said retaining means and with said face of the other bearing member.

9. A bearing as set forth in claim 1, wherein said antifriction elements are of resilient material and are received in respective recesses of said cage under compressive stress, each element expanding when released from the corresponding recess.

10. An arrangement as set forth in claim 4, wherein said stiffening member is a metal plate adhered to the backing surface of the gliding element.

11. An arrangement as set forth in claim 4, wherein said stiffening member is a metallic compression spring imbedded in said gliding element.